Sept. 10, 1935.   C. O. LEA   2,014,183
DOUGH WORKING PRESSURE BOARD
Filed Jan. 4, 1935
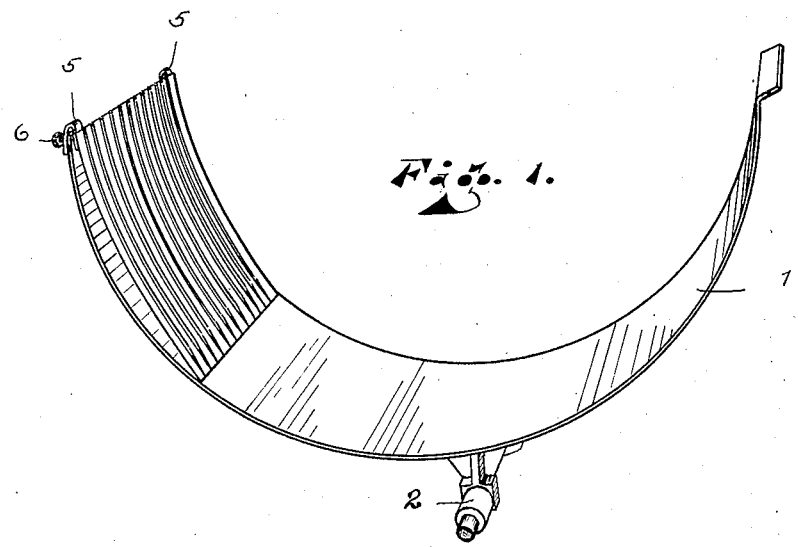
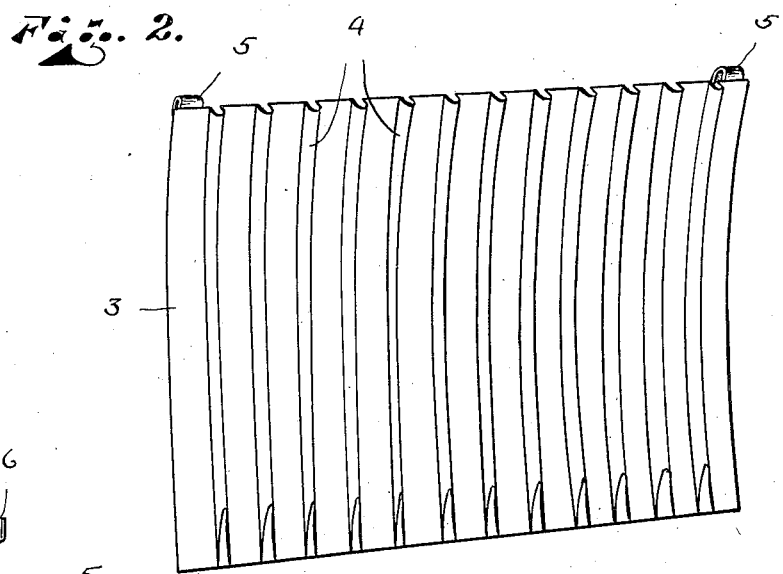
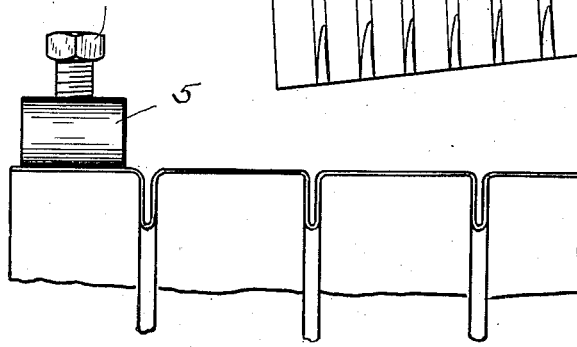
INVENTOR.
Christian O. Lea.
BY
Geo. Stevens
ATTORNEY.

Patented Sept. 10, 1935

2,014,183

UNITED STATES PATENT OFFICE 2,014,183

DOUGH WORKING PRESSURE BOARD

Christian Olaff Lea, Chippewa Falls, Wis.

Application January 4, 1935, Serial No. 402

3 Claims. (Cl. 107—9)

This invention relates to improvements in machines for rolling and forming dough or the like substances, and more particularly to an improvement in bread molding machines such as used by commercial bakers, and the like.

In the common bread molding machine the dough is fed thereto through a hopper to and successively through a plurality of slightly spaced rollers, which presses the dough into a flat ribbon like form, and thence onto a large revolvable drum which carries the dough thereabouts. Spaced from and extending about the lower approximate half of this drum is the pressure board, it being in width approximately equal to that of the drum, and its curvature being concentric with the drum. Some of these pressure boards are pivotally mounted midway their ends to the frame of the machine so that they may flex slightly at their ends. An apron guides the dough on the drum between it and the pressure board and as the drum revolves the dough therebetween it rolls it into the proper form for placing in the baking pans. In this rolling process it is obvious that large air holes are formed in the dough, and which has been a constant source of trouble with bakers using these machines, but with the present equipment there seems to be no way of avoiding this defect.

Consequently it is an object of my invention to provide an attachment for one end of the pressure board of these molding machines which will penetrate the molded dough loaf and open all air pockets therein and squeeze out all surplus air which may be trapped therein.

It is well known that attachments have been added to the pressure boards of such machines for the purpose of cutting the dough into smaller units for the baking of biscuits, buns, or the like; but, while these actually do cut into the dough, they sever the single unit into a number of smaller units and are thus useless in accomplishing the purpose of my invention.

While I have shown by improvement as being in the form of an attachment to one end of the pressure board, it is to be understood that the pressure board itself could be so formed at one end as to accomplish the same result as my attachment, and therefore I do not wish to be limited in the use of my invention to an attachment only.

Referring now to the accompanying drawing, forming part of this application, and wherein like reference characters indicate like parts:

Figure 1 is a perspective view of one form of pressure board for a bread molding machine and illustrating my improved attachment applied thereto.

Figure 2 is a perspective view of the attachment alone.

Figure 3 is a broken upper edge view of the attachment.

As is obvious from the drawing, the pressure board 1 is a flat, semi-circularly shaped piece of sheet metal, relatively narrow in comparison to its length, and the same is journalled to the frame of the machine as by the bearing indicated at 2 so that the pressure board encircles the lower approximate half of the drum.

My improved apron-like attachment comprises a unit of sheet metal of the same width as that of the pressure board, and curved but on a greater radius than the curvature of the pressure board. The attachment, indicated at 3, has a plurality of equi-spaced ribs 4 pressed therein and being spaced approximately an inch apart. These ribs are chamfered off adjacent their lowermost ends and merge into the plane surface of the attachment at the lower extremity. The edges of the cut portion of the ribs are squeezed together and sharpened so that as the dough is rolled thereupon the ribs cut into the same and open the air holes, and then as the rolling proceeds, and because the curvature of the attachment is on a greater radius than that of the pressure board, the dough will be subjected to a greater though somewhat yieldable and varying squeeze thereby forcing all air out of the pockets which the sharper ends of the ribs just previously opened.

A pair of metal clips illustrated at 5 are attached one to each upper corner of the attachment and which fold over and overlap the upper edge of the end of the pressure board, thus forming an apron-like attachment to the board and any form of clamping nut or screw 6 may be used to secure the attachment to the board.

It has been found that by the use of this attachment, the dough is freed of substantially all larger pockets of air and the texture of the ultimate loaf greatly improved as well as its general appearance.

Having thus described my invention, what I claim and desire to secure by Letters Patent, is:

1. In means for removing air from bread dough, the combination of an attachment for the pressure board of dough working machinery comprising an apron-like metallic sheet having a plurality of equi-spaced ribs or corrugations pressed therein for cutting into and liberating air from pockets in dough.

2. In means for removing air from bread dough, the combination of an attachment for the pressure board of dough working machinery comprising a metallic sheet having a plurality of equispaced ribs or corrugations pressed therein, said rigs being chamfered off and sharpened at one end, the side walls of each rib adjacent said end being pinched together forming a wedge shaped terminal of the rib.

3. In means for removing air from bread dough, the combination with a curved pressure board for dough working machinery, of a curved apron-like member substantially the full width of said board suspended from its upper corner only upon the pressure board, a plurality of curved yieldable parallel ribs upon said apron member, and said ribs being of greater radius than that of the pressure board.

CHRISTIAN OLAFF LEA.